(12) United States Patent
Fukushi et al.

(10) Patent No.: US 10,927,235 B2
(45) Date of Patent: Feb. 23, 2021

(54) FLUORINATED THERMOSETTING PLASTIC WITH IODINE ENDGROUPS

(71) Applicant: 3M INNOVATIVE PROPERTIES COMPANY, St. Paul, MN (US)

(72) Inventors: Tatsuo Fukushi, Woodbury, MN (US); Larry A. Last, Moulton, AL (US); Michael H. Mitchell, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/741,785

(22) PCT Filed: Jul. 11, 2016

(86) PCT No.: PCT/US2016/041695
§ 371 (c)(1),
(2) Date: Jan. 4, 2018

(87) PCT Pub. No.: WO2017/011374
PCT Pub. Date: Jan. 19, 2017

(65) Prior Publication Data
US 2018/0208743 A1    Jul. 26, 2018

Related U.S. Application Data

(60) Provisional application No. 62/191,562, filed on Jul. 13, 2015.

(51) Int. Cl.
| | | |
|---|---|---|
| *C08F 214/26* | (2006.01) | |
| *C08K 5/3492* | (2006.01) | |
| *C08K 5/00* | (2006.01) | |
| *C08K 5/14* | (2006.01) | |
| *C08F 214/22* | (2006.01) | |

(52) U.S. Cl.
CPC ........ *C08K 5/34924* (2013.01); *C08F 214/22* (2013.01); *C08F 214/26* (2013.01); *C08K 5/0025* (2013.01); *C08K 5/14* (2013.01)

(58) Field of Classification Search
CPC .... C08F 214/22; C08F 214/26; C08F 214/28; C08F 2810/40; C08F 2/38; C08K 5/0025
See application file for complete search history.

(56) References Cited

U.S. PATENT DOCUMENTS

| | | |
|---|---|---|
| 4,123,603 A | 10/1978 | Stewart, Jr. |
| 4,158,678 A | 1/1979 | Tatemoto |
| 4,234,770 A | 11/1980 | Higuchi |
| 4,243,770 A | 1/1981 | Tatemoto |
| 4,696,989 A | 9/1987 | Oka |
| 5,173,553 A | 12/1992 | Albano |
| 5,225,504 A | 7/1993 | Tatsu |
| 5,639,838 A | 6/1997 | Albano |
| 6,310,141 B1 | 10/2001 | Chen |
| 6,734,254 B1 | 5/2004 | Worm |
| 8,835,551 B2 | 9/2014 | Fukushi |
| 9,156,926 B2 | 10/2015 | Lochhaas |
| 2010/0068436 A1* | 3/2010 | Shimizu ............... C08F 214/18 428/36.91 |

FOREIGN PATENT DOCUMENTS

| | | | |
|---|---|---|---|
| CN | 103038266 | 4/2013 | |
| EP | 0618241 | 10/1994 | |
| EP | 0518073 | 11/1998 | |
| JP | 08259703 | 10/1996 | |
| WO | WO 2009-027213 | 3/2009 | |
| WO | WO 2013-087596 | 6/2013 | |
| WO | WO-2014099311 A1 * | 6/2014 | ............ C08F 14/16 |
| WO | WO 2014-206833 | 12/2014 | |
| WO | WO 2015-047749 | 4/2015 | |
| WO | WO 2017-011379 | 1/2017 | |

OTHER PUBLICATIONS

Boyer, "Iodine Transfer Polymerization (ITP) of Vinylidene Fluoride (VDF). Influence of the Defect of VDF Chaining on the Control of ITP", Macromolecules, 2005, vol. 38, No. 25, pp. 10353-10362.
Oka, "Vinylidene Fluoride—Hexafluoropropylene Copolymer Having Terminal Iodines", Contemporary Topics in Polymer Science, 1984, vol. 04, pp. 763-777.
Salamone, "Polymeric Materials Encyclopedia", 1996, vol. 01, pp. 432-440.
International Search Report for PCT International Application No. PCT/US2016/041695, dated Sep. 8, 2016, 5 pages.
SAE Aerospace Information Report 1387, "Designing with Elastomers for Use at Low Temperatures, Near or Below Glass Transition," Issued Mar. 1976, Revised Dec. 2003, 19 pages.
Henning, et al., "Fundamentals of Curing Elastomers with Peroxides and Coagents II: Understanding the Relationship Between Coagent and Elastomer," Cray Valley USA, LLC., Jul. 21, 2011, XP055738828, Retrieved from the Internet: URL:http://www.crayvalley.com/docs/default-source/technical-paper/ fundamentals-of-curing-elastomers-with-peroxides-and-coagents-part-2-(1 ).pdf?sfvrsn=ceda 1f17 _ 4 [retrieved on Oct. 12, 2020].

* cited by examiner

*Primary Examiner* — Robert C Boyle
(74) *Attorney, Agent, or Firm* — Julie Lapos-Kuchar

(57) ABSTRACT

Described herein is a composition comprising: a fluorinated thermosetting plastic comprising repeating divalent monomeric units derived from TFE, HFP and VDF and further comprising a least 0.1-1% by weight iodine endgroups, wherein the fluorinated thermosetting plastic has an MFI greater than 5 g/10 min at 265° C. and 5 kg; and a curing agent.

20 Claims, No Drawings

FLUORINATED THERMOSETTING PLASTIC WITH IODINE ENDGROUPS

CROSS REFERENCE TO RELATED APPLICATIONS

This application is a national stage filing under 35 U.S.C. 371 of PCT/US2016/041695, filed Jul. 11, 2016, which claims the benefit of U.S. Application No. 62/191,562, filed Jul. 13, 2015, the disclosure of which is incorporated by reference in its/their entirety herein.

TECHNICAL FIELD

A fluorinated thermosetting plastic comprising iodine endgroups is disclosed.

BACKGROUND

Compression set resistance is one of the most important properties in seal and gasket materials. Compression set is the deformation of the polymer remaining once a force is removed. Generally, lower compression set values are better (i.e., less deformation of the material). Because of their elasticity, seals and gaskets are typically made from an elastomeric material.

Perfluoroelastomers have excellent properties including temperature resistance and good compression set resistance. However the cost of perfluoroelastomers can make them undesirable or prohibitive for certain applications and markets.

SUMMARY

There is a desire to identify new materials have good compression set. Since seals and gaskets are typically prepared at Elastomer compounding manufacturers, where the elastomer is mixed with curing agents and other adjuvants, there is also a desire for these new materials to be processed in the same manner as an elastomer, for example, compounding using a two-roll mill or an internal mixer.

In one aspect, a composition is provided comprising a fluorinated thermosetting plastic comprising repeating divalent monomeric units derived from TFE, HFP and VDF and further comprising a least 0.1-1% by weight iodine endgroups, wherein the fluorinated thermosetting plastic has an MFI greater than 5 g/10 min at 265° C. and 5 kg; and a curing agent.

The above summary is not intended to describe each embodiment. The details of one or more embodiments of the invention are also set forth in the description below. Other features, objects, and advantages will be apparent from the description and from the claims.

DETAILED DESCRIPTION

As used herein, the term

"a", "an", and "the" are used interchangeably and mean one or more; and

"and/or" is used to indicate one or both stated cases may occur, for example A and/or B includes, (A and B) and (A or B);

"amorphous" a material such as a polymer, having an absence of long-range order (i.e., the arrangement and orientation of the macromolecules beyond their nearest neighbors is understood), an amorphous polymer does not have a distinct and detectable melting point;

"backbone" refers to the main continuous chain of the polymer;

"copolymer" refers to a polymeric material comprising at least two different interpolymerized monomers (i.e., the monomers do not have the same chemical structure) and include terpolymers (three different monomers), tetrapolymers (four different monomers), etc.;

"crosslinking" refers to connecting two pre-formed polymer chains using chemical bonds or chemical groups;

"cure site" refers to functional groups, which may participate in crosslinking;

"glass transition temperature" or "$T_g$" refers to the temperature at which a polymeric material transitions from a glassy state to a rubbery state. The glassy state is typically associated with a material that is, for example, brittle, stiff, rigid, or combinations thereof. In contrast, the rubbery state is typically associated with a material that is, for example, flexible and elastomeric.

"interpolymerized" refers to monomers that are polymerized together to form a polymer backbone;

"monomer" is a molecule which can undergo polymerization which then form part of the essential structure of a polymer;

"perfluorinated" means a group or a compound derived from a hydrocarbon wherein all hydrogen atoms have been replaced by fluorine atoms. A perfluorinated compound may however still contain other atoms than fluorine and carbon atoms, like chlorine atoms, bromine atoms and iodine atoms; and "polymer" refers to a macrostructure comprising interpolymerized units of monomers.

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

According to ASTM D 395-89a, compression set (CS) can be calculated per equation 1

$$CS = \frac{t_0 - t_i}{t_0 - t_n} \times 100 \qquad 1$$

where $t_0$ is the original thickness of specimen, $t_i$ is the final thickness of specimen, and $t_n$ is the thickness of the spacer bar used.

In a typical compression set test, an O-ring is put under a compression ratio of 25% and held at 200° C. for 70 hours. Then the O-ring is removed from the heating chamber and the compression is released. A rapid recovery close to the original thickness ($t_0$) from the 25% deformed state is ideal for ensuring good seals and gaskets that can be used in high temperature applications. For example, in use, the seals and gaskets are compressed in the presence of a temperature greater than room temperature and then subsequently cooled to room temperature and the seal or gasket is expected to maintain its seal.

Traditionally, cured amorphous materials have been used in sealing applications (such as in seals and gaskets) because of the materials ability to "bounce-back". Fluoropolymers that are amorphous are typically used to make fluoroelastomers by curing or vulcanizing the fluoropolymer. Therefore, the amorphous polymers may contain cure-sites which can react to form a three dimensional cross-linking network.

The elastomeric properties generally are obtained after curing where the polymer chains are linked together to form the elastomer (i.e., cured part).

Previously, a crystallinity segment in seal and gasket materials was thought to have a negative effect on compression set resistance because the crystallinity can delay or hinder a rapid recovery of the material due to the alignment of the crystalline segments. For example, if a polymer contains a crystallinity segment, the crystallinity segment can melt during the compression set test temperature, e.g. 200° C., however, it was believed that the material would not recover to its original shape due to recrystallization and rearrangement during cooling to room temperature. Thus, this re-crystallization was considered to have a detrimental effect on compression set resistance.

However, in the present application, it has been discovered that a semi-crystalline polymer that is subsequently crosslinked via iodine end-groups can be used to make seals and gaskets, which have surprisingly good compression set resistance.

The present disclosure relates to a thermosetting polymer comprising iodine end groups. A thermosetting polymer is a polymer that softens when initially heated, but once cooled, it cures or crosslinks becoming permanently rigid.

The thermosetting polymer of the present disclosure is semi-crystalline, meaning that if studied under a differential scanning calorimetry (DSC), the polymer would have at least one melting point temperature ($T_m$) of greater than 60° C. and a measurable enthalpy, for example, greater than 0 J/g, or even greater than 0.01 J/g. The enthalpy is determined by the area under the curve of the melt transition as measured by DSC using the test disclosed herein and expressed as Joules/gram (J/g).

The crystallinity index ($\Psi$) of a polymer can be derived from the X-ray diffraction (XRD) pattern of the amorphous phase $l_a$ and the crystalline phase $l_c$ by Equation 2.

$$\Psi = \frac{l_c}{(l_c + l_a)} \qquad 2$$

The fluorinated thermosetting plastic of the present disclosure is a random fluorinated copolymer derived from at least the following monomers: tetrafluoroethylene (TFE), hexafluoropropylene (HFP), and vinylidene fluoride (VDF). In one embodiment, the fluorinated thermosetting plastic is derived at least 20, 25 or even 30 wt % and at most 40, 50, 55, or even 60 wt % TFE; at least 10, 15, or even 20 wt % and at most 25 or even 30 wt % HFP; and at least 15, 20, or even 30 wt % and at most 50, 55, or even 60 wt % VDF.

Additional monomers may also be incorporated into the polymer, such as perfluorovinyl ether, perfluoroallyl ether monomers, and cure site monomers. Typically these additional monomers are used at percentages of less than 10, 5, or even 1% by weight relative to the other monomers used.

Examples of perfluorovinyl ethers that can be used in the present disclosure include those that correspond to the formula: $CF_2=CF-O-R_f$ wherein $R_f$ represents a perfluorinated aliphatic group that may contain no, one or more oxygen atoms and up to 12, 10, 8, 6 or even 4 carbon atoms. Exemplary perfluorinated vinyl ethers correspond to the formula: $CF_2=CFO(R^a_fO)_n(R^b_fO)_mR^c_f$ wherein $R^a_f$ and $R^b_f$ are different linear or branched perfluoroalkylene groups of 1-6 carbon atoms, in particular 2-6 carbon atoms, m and n are independently 0-10 and $R^c_f$ is a perfluoroalkyl group of 1-6 carbon atoms. Specific examples of perfluorinated vinyl ethers include perfluoro (methyl vinyl) ether (PMVE), perfluoro (ethyl vinyl) ether (PEVE), perfluoro (n-propyl vinyl) ether (PPVE-1), perfluoro-2-propoxypropylvinyl ether (PPVE-2), perfluoro-3-methoxy-n-propylvinyl ether, perfluoro-2-methoxy-ethylvinyl ether, $CF_2=CFOCF_2OCF_3$, $CF_2=CFOCF_2OCF_2CF_3$, and $CF_3-(CF_2)_2-O-CF(CF_3)-CF_2-O-CF(CF_3)-CF_2-O-CF=CF_2$.

Examples of perfluoroallyl ethers that can be used in the present disclosure include those that correspond to the formula: $CF_2=CF(CF_2)-O-R_f$ wherein $R_f$ represents a perfluorinated aliphatic group that may contain no, one or more oxygen atoms and up to 10, 8, 6 or even 4 carbon atoms. Specific examples of perfluorinated allyl ethers include: $CF_2=CF_2-CF_2-O-(CF_2)_nF$ wherein n is an integer from 1 to 5, and
$CF_2=CF_2-CF_2-O-(CF_2)_x-O-(CF_2)_y-F$ wherein x is an integer from 2 to 5 and y is an integer from 1 to 5. Specific examples of perfluorinated allyl ethers include perfluoro (methyl allyl) ether ($CF_2=CF-CF_2-O-CF_3$), perfluoro (ethyl allyl) ether, perfluoro (n-propyl allyl) ether, perfluoro-2-propoxypropyl allyl ether, perfluoro-3-methoxy-n-propylallyl ether, perfluoro-2-methoxy-ethyl allyl ether, perfluoro-methoxy-methyl allyl ether, and $CF_3-(CF_2)_2-O-CF(CF_3)-CF_2-O-CF(CF_3)-CF_2-O-CF_2CF=CF_2$, and combinations thereof.

Examples of cure site monomers include, halogenated cure site monomers such as those of the formula: a) $CX_2=CX(Z)$, wherein: (i) X each is independently H or F; and (ii) Z is I, Br, $R_f-U$ wherein U=I or Br and $R_f=$a perfluorinated alkylene group optionally containing O atoms or (b) $Y(CF_2)_qY$, wherein: (i) Y is independently selected from Br, I, or Cl and (ii) q=1-6. In addition, non-fluorinated bromo- or iodo-olefins, e.g., vinyl iodide and allyl iodide, can be used. In some embodiments, the cure site monomers are derived from one or more compounds selected from the group consisting of $CF_2=CFCF_2I$, $ICF_2CF_2CF_2CF_2I$, $CF_2=CFCF_2CF_2I$, $CF_2=CFOCF_2CF_2I$, $CF_2=CFOCF_2CF_2CF_2I$, $CF_2=CFOCF_2CF_2CH_2I$, $CF_2=CFCF_2OCH_2CH_2I$, $CF_2=CFO(CF_2)_3-OCF_2CF_2I$, $CF_2=CFCF_2Br$, $CF_2=CFOCF_2CF_2Br$, $CF_2=CFCl$, $CF_2=CFCF_2Cl$, and combinations thereof.

The fluorinated thermosetting plastic of the present disclosure comprises iodine endgoups (i.e., the polymer has terminal groups that comprise iodine). In one embodiment, the fluorinated thermosetting plastic comprises at least 0.1, or even 0.5; and at most 0.8, or even 1 wt % iodine end groups based on the weight of the fluorinated plastic. These iodine endgroups are introduced into the polymer during its polymerization through the use of an iodo chain transfer agent, and/or an iodinated cure site monomer.

In one embodiment of the present disclosure, the fluorinated thermosetting plastic has a glass transition (Tg) temperature of greater than −10° C., −5° C., 0° C., 5° C., 10° C., 15° C., or even 20° C.; and less than 80° C., 70° C., 60° C., or even 50° C. as measured by DSC.

In one embodiment of the present disclosure, the fluorinated thermosetting plastic has a melting temperature (Tm) of at least 60° C., 70° C., 80° C., or even 100° C.; and at most 320° C., 300° C., 280° C., 250° C., or even 200° C. In one embodiment, the melting point of the fluorinated thermosetting plastic is less than the upper use temperature of the resulting article.

In one embodiment, the fluorinated thermosetting plastic has an MFI greater than 5, 5.5, 6, or even 7 g/10 min at 265° C. and 5 kg. Melt Flow Index (MFI) or Melt Flow Rate (MFR) can be used as a measure of the ease of the melt of a fluorothermoplastic polymer. As MFI is higher, flow is better. It is also an indirect measurement of molecular weight. As MFI is higher, the molecular weight is lower. Typical MFI measurement settings for temperature and weight depend on the melting point of thermoplastics. When the melting point of a thermoplastic is higher, the temperature setting of the MFI needs to be higher.

In one embodiment of the present disclosure, the weight average molecular weight of the fluorinated thermosetting copolymer is at least 50,000 dalton, at least 100,000 dalton, at least 300,000 dalton, at least 500,000 dalton, at least, 750,000 dalton, at least 1,000,000 dalton, or even at least 1,500,000 dalton and not such a high molecular weight as to cause premature gelling of the polymer.

The fluorinated thermosetting plastics of the present disclosure can be prepared by various known methods as long as the iodine is incorporated into the fluorinated polymer.

In one embodiment, the polymer can be prepared by iodine transfer polymerization as described in U.S. Pat. No. 4,158,678 (Tatemoto et al.). Briefly, during an emulsion polymerization, a radical initiator and an iodine chain transfer agent is used to generate a polymer latex. The radical polymerization initiator to be used for preparing the polymer may be the same as the initiators known in the art that are used for polymerization of fluorine-containing elastomer. Examples of such an initiator are organic and inorganic peroxides and azo compounds. Typical examples of the initiator are persulfates, peroxy carbonates, peroxy esters, and the like. In one embodiment, ammonium persulfate (APS) is used, either solely, or in combination with a reducing agent like sulfites. Typically, the iodine chain transfer agent is a diiodine compound used from 0.01 to 1% by weight based on the total weight of the amorphous polymer. Exemplary diiodine compounds include: 1,3-diiodoperfluoropropane, 1,4-diiodoperfluorobutane, 1,3-diiodo-2-chloroperfluoropropane, 1,5-diiodo-2,4-dichloroperfluoropentane, 1,6-diiodoperfluorohexane, 1,8-diiodoperfluorooctane, 1,10-diiodoperfluorodecane, 1,12-diiodoperfluorododecane, 1,16-diiodoperfluorohexadecane, diiodomethane and 1,2-diiodoethane. For the emulsion polymerization, various emulsifying agents can be used. From the viewpoint of inhibiting a chain transfer reaction against the molecules of emulsifying agent which arises during the polymerization, desirable emulsifying agents are salts of carboxylic acid having a fluorocarbon chain or fluoropolyether chain. It is desirable that an amount of emulsifying agent is from about 0.05% by weight to about 2% by weight, or even 0.2 to 1.5% by weight based on the added water. The thus-obtained latex comprises a fluorinated polymer that has an iodine atom at a terminal position.

The fluorinated thermosetting plastic of the present disclosure can be processed similarly to an elastomer, for example during the compounding of an amorphous gum, the amorphous polymer is mixed or blended with the requisite curing agents and other adjuvants using a two-roll mill or an internal mixer. In order to be mill blended, the curable composition must have a sufficient modulus. In other words, not too soft that it sticks to the mill, and not too stiff that it cannot be banded onto mill. Thus, in one embodiment, the fluorinated thermosetting plastic has a modulus of at least 0.001, 0.005, 0.01, 0.05, 0.1, 0.3, or even 0.5 MPa; and at most 2.0, 2.2, or even 2.5 MPa at 100° C. as measured at a strain of 1% and a frequency of 1 Hz (e.g., from the storage modulus obtained via ASTM 6204-07), enabling it to be processed at room or slightly above room temperature.

In one embodiment of the present disclosure, the composition comprising the fluorinated thermosetting plastic and the curing agent is substantially free of an amorphous polymer (i.e., the composition comprises less than 5, 2, 1, or even 0.1% by weight of an amorphous polymer).

The fluorinated thermosetting plastic polymer may or may not be crosslinked. Crosslinking of the polymer can be performed using a cure system that is known in the art such as: a peroxide curative, 2,3-dimethyl-2,3-dimethyl-2,3-diphenyl butane, and other radical initiators such as an azo compounds, and other cure systems such as a polyol, and polyamine cure systems.

Peroxide curatives include organic or inorganic peroxides. Organic peroxides are preferred, particularly those that do not decompose during dynamic mixing temperatures.

The crosslinking using a peroxide can be performed generally by using an organic peroxide as a crosslinking agent and, if desired, a crosslinking aid including, for example, bisolefins (such as $CH_2=CH(CF_2)_6 CH=CH_2$, and $CH_2=CH(CF_2)_8 CH=CH_2$), diallyl ether of glycerin, triallylphosphoric acid, diallyl adipate, diallylmelamine and triallyl isocyanurate (TAIC), fluorinated TAIC comprising a fluorinated olefinic bond, tri(methyl)allyl isocyanurate (TMAIC), tri(methyl)allyl cyanurate, poly-triallyl isocyanurate (poly-TAIC), xylylene-bis(diallyl isocyanurate) (XBD), and N,N'-m-phenylene bismaleimide.

Examples of the organic peroxide include benzoyl peroxide, dicumyl peroxide, di-tert-butyl peroxide, 2,5-dimethyl-2,5-di-tert-butylperoxyhexane, 2,4-dichlorobenzoyl peroxide, 1,1-bis(tert-butylperoxy)-3,3,5-trimethylchlorohexane, tert-butyl peroxy isopropylcarbonate (TBIC), tert-butyl peroxy 2-ethylhexyl carbonate (TBEC), tert-amyl peroxy 2-ethylhexyl carbonate, tert-hexylperoxy isopropyl carbonate, carbonoperoxoic acid, O,O'-1,3-propanediyl OO,OO'-bis(1,1-dimethylethyl) ester, tert-butylperoxy benzoate, t-hexyl peroxy-2-ethylhexanoate, t-butyl peroxy-2-ethylhexanoate, di(4-methylbenzoyl) peroxide, laurel peroxide and cyclohexanone peroxide. Other suitable peroxide curatives are listed in U.S. Pat. No. 5,225,504 (Tatsu et al.). The amount of peroxide curing agent used generally will be 0.1 to 5, preferably 1 to 3 parts by weight per 100 parts of fluorinated block copolymer. Other conventional radical initiators are suitable for use with the present disclosure.

Examples of azo compounds useful in curing the fluorinated block copolymers of the present disclosure are those that have a high decomposition temperature. In other words, they decompose above the upper use temperature of the resulting product. Such azo compounds may be found for example in "Polymeric Materials Encyclopedia, by J. C. Salamone, ed., CRC Press Inc., New York, (1996) Vol. 1, pages 432-440.

The crosslinking using a polyol is performed generally by using a polyol compound as a crosslinking agent, a crosslinking aid such as ammonium salt, phosphonium salt and iminium salt, and a hydroxide or oxide of a divalent metal such as magnesium, calcium, or zinc. Examples of the polyol compound include bisphenol AF, bisphenol A, bisphenol S, dihydroxybenzophenone, hydroquinone, 2,4,6-trimercapto-S-triazine, 4,4'-thiodiphenol, and a metal salt thereof.

The crosslinking using a polyamine is performed generally by using a polyamine compound as a crosslinking agent, and an oxide of a divalent metal such as magnesium, calcium, or zinc. Examples of the polyamine compound or the precursor of the polyamine compound include hexamethylenediamine and a carbamate thereof, 4,4'-bis(aminocyclohexyl)methane and a carbamate thereof, and N,N'-dicinnamylidene-1,6-hexamethylenediamine.

The crosslinking agent and crosslinking aid each may be used in a conventionally known amount, and the amount used can be appropriately determined by one skilled in the art. The amount used of each of these components participating in the crosslinking may be, for example, about 1 part by mass or more, about 5 parts by mass or more, about 10 parts by mass or more, or about 15 parts by mass or more, and about 60 parts by mass or less, about 40 parts by mass or less, about 30 parts by mass or less, or about 20 parts by mass or less, per 100 parts by mass of the fluorinated polymer. The total amount of the components participating in the crosslinking may be, for example, about 1 part by mass or more, about 5 parts by mass or more, or about 10 parts by mass or more, and about 60 parts by mass or less, about 40 parts by mass or less, or about 30 parts by mass or less, per 100 parts by mass of the fluorinated polymer.

For the purpose of, for example, enhancing the strength or imparting the functionality, conventional adjuvants, such as, for example, acid acceptors, fillers, process aids, or colorants may be added to the curable composition.

For example, acid acceptors may be used to facilitate the cure and thermal stability of the composition. Suitable acid acceptors may include magnesium oxide, lead oxide, calcium oxide, calcium hydroxide, dibasic lead phosphite, zinc oxide, barium carbonate, strontium hydroxide, calcium carbonate, hydrotalcite, alkali stearates, magnesium oxalate, or combinations thereof. The acid acceptors are preferably used in amount raging from about 1 to about 20 parts per 100 parts by weight of the fluorinated polymer.

Fillers include: an organic or inorganic filler such as clay, silica ($SiO_2$), alumina, iron red, talc, diatomaceous earth, barium sulfate, wollastonite ($CaSiO_3$), calcium carbonate ($CaCO_3$), calcium fluoride, titanium oxide, iron oxide and carbon black fillers, a polytetrafluoroethylene powder, PFA (TFE/perfluorovinyl ether copolymer) powder, an electrically conductive filler, a heat-dissipating filler, and the like may be added as an optional component to the composition. Those skilled in the art are capable of selecting specific fillers at required amounts to achieve desired physical characteristics in the vulcanized compound. The filler components may result in a compound that is capable of retaining a preferred elasticity and physical tensile, as indicated by an elongation and tensile strength value, while retaining desired properties such as retraction at lower temperature (TR-10). In one embodiment, the composition comprises less than 40, 30, 20, 15, or even 10% by weight of the filler.

The fluorinated polymer composition is mixed with the curing agent and optional conventional adjuvants. The method for mixing include, for example, kneading with use of a twin roll for rubber, a pressure kneader or a Banbury mixer.

The mixture may then be processed and shaped such as by extrusion or molding to form an article of various shapes such as sheet, a hose, a hose lining, an o-ring, a packer, a gasket, or a seal composed of the composition of the present disclosure. The shaped article may then be heated to cure the composition and form a cured elastomeric article.

Pressing of the compounded mixture (i.e., press cure) is typically conducted at a temperature of about 120-220° C., or even about 140-200° C., for a period of about 1 minute to about 15 hours, usually for about 1-15 minutes. A pressure of about 700-20,000 kPa, or even about 3400-6800 kPa, is typically used in molding the composition. The molds first may be coated with a release agent and prebaked.

The molded vulcanizate can be post cured in an oven at a temperature of about 140-240° C., or even at a temperature of about 160-230° C., for a period of about 1-24 hours or more, depending on the cross-sectional thickness of the sample. For thick sections, the temperature during the post cure is usually raised gradually from the lower limit of the range to the desired maximum temperature. The maximum temperature used is preferably about 260° C., and is held at this value for about 1 hour or more.

Compositions of the present disclosure comprising a fluorinated thermosetting plastic may be used in articles, such as a hose, a gasket, a seal, a sheet, or a packer. These compositions may or may not be post cured.

EXAMPLES

Unless otherwise noted, all parts, percentages, ratios, etc. in the examples and the rest of the specification are by weight, and all reagents used in the examples were obtained, or are available, from general chemical suppliers such as, for example, Sigma-Aldrich Company, Saint Louis, Mo., or may be synthesized by conventional methods.

These abbreviations are used in the following examples: phr=parts per hundred rubber; g=grams, min=minutes, psi=pounds per square inch, hr=hour, ° C.=degrees Celsius, MPa=mega Pascals, dN-m=deci-newton-meter and wt=weight.

Materials

| Material | Description |
| --- | --- |
| carbon black | Carbon black commercially available under the trade designation "THERMAX N990" from Cancarb Ltd, Medicine Hat, Alta., Canada |
| Co-agent | Triallyl-isocyanurate commercially available under the trade designation "TAIC" from Nippon Kasei Chemical Co. Ltd., Tokyo, Japan |
| Peroxide | 2,5-dimethyl-2,5-di(t-butylperoxy)-hexane, 50% active, available under the trade designation "VAROX DBPH-50" from Vanderbilt Chemicals, LLC., Norwalk, CT. |
| Polymer A | Fluoroplastic polymer having interpolymerized units of 42 wt. % TFE, 20 wt. % HFP and 38 wt. % VDF having a melting point of 118° C. and a crystallinity index of 0.26 |

Methods

Iodine Content

The iodine content was determined by X-ray fluorescence (XRF) (Supermini200, Rigaku Corp., Tokyo, Japan). The iodine content is reported as the wt. % versus the weight of the fluoropolymer.

Monomer Composition Ratio

The TFE, HFP and VDF monomer composition ratio was conducted by integrated absorbance ratio of a FTIR spectrum of the fluoropolymers. The spectrum was calibrated by NMR monomer composition ratio analysis. Analysis was performed using a Fa Nicolet DX510 FTIR spectrometer using OMNIC software (ThermoFisher Scientific, Waltham, Mass.).

Melting Point and Glass Transition

Melting point ($T_m$) and glass transition temperature ($T_g$) were determined by a differential scanning calorimetry (DSC, Q2000 by TA Instruments, New Castle, Del.) under a nitrogen flow. The sample size was 5 mg±0.25 mg. A DSC thermogram was obtained from the second heat of a heat/cool/heat cycle. The first heat cycle started at −85° C. and was ramped at a rate of 10° C./min up to a final temperature, wherein the final temperature was selected to be 50-100° C. above the expected melt temperature. The cooling cycle started at the final temperature from the first heat cycle and was cooled to −85° C. at 10° C./min. The second heat cycle started at −85° C. and was ramped at a rate of 10° C./min back up to a final temperature.

Mooney Viscosity

The Mooney viscosity values were measured in a similar manner as ASTM D 1646-06 Type A by a MV2000 instrument (available from Alpha Technologies, Ohio) using large rotor (ML 1+10) at 121° C. Results are reported in Mooney units.

Cure Rheology

Cure rheology tests were carried out using uncured, compounded samples using a rheometer marketed under the trade designation PPA 2000 by Alpha technologies, Akron, Ohio, in accordance with ASTM D 5289-93a at 177° C., no pre-heat, 12 minute elapsed time, and a 0.5 degree arc. Both the minimum torque ($M_L$) and highest torque attained during a specified period of time when no plateau or maximum torque ($M_H$) was obtained were measured. Also measured were the time for the torque to increase 2 units above $M_L$ ($t_S2$), the time for the torque to reach a value equal to $M_L+0.1(M_H-M_L)$, (t'10), the time for the torque to reach a value equal to $M_L+0.5(M_H-M_L)$, (t'50), and the time for the torque to reach $M_L+0.9(M_H-M_L)$, (t'90).

Molding O-ring and Compression Set

O-rings (214, AMS AS568) were mold at 177° C. for 10 minutes. Then the press-cured O-rings were post-cured at 230° C. for 4 hours. The press-cured and post-cured O-rings were tested for compression set for 70 hours at 200° C. in accordance with ASTM D 395-03 Method B and ASTM D 1414-94 with 25% initial deflection. Results are reported as percentages.

EXAMPLES

Example 1

A 40 liter reactor was charged with 22,500 g water, 330 g $CF_3$—O—$(CF_2)_3$—O—CFH—$CF_2$—COONH$_4$ (30% aqueous solution) and 60 g 1,4-diiodooctafluorobutane. The reactor was evacuated, the vacuum was broken and it was pressurized with nitrogen to 25 psi (0.17 MPa). This vacuum and pressurization was repeated three times. After removing oxygen, the reactor was heated to 71.1° C. and pressurized to 83 psi (0.57 MPa) with hexafluoropropylene (HFP). The reactor was then pressurized to 172 psi (1.19 MPa) with vinylidene fluoride (VDF) and bringing reactor pressure to 220 psi (1.52 MPa) with tetrafluoroethylene (TFE). The reactor was agitated at 350 rpm and the reaction was initiated with addition of 10 g ammonium persulfate (APS) dissolved in 500 g deionized water. As reactor pressure dropped due to monomer consumption in the polymerization reaction, HFP, TFE and VDF was continuously fed to the reactor to maintain the pressure at 220 psi (1.52 MPa). The ratio of HFP and VDF was 0.52 by weight and the ratio of TFE and VDF was 1.22 by weight. After 77 minutes the monomer feeds were discontinued and the reactor was cooled. The resulting dispersion had a solid content of 25.3 wt. % and a pH of 3.8. The dispersion particle size was 124 nm.

For the coagulation, a MgCl$_2$/deionized water solution was added to the latex, using roughly the same amount of MgCl$_2$ solution as latex. The MgCl$_2$ solution contained 1.25 wt. % MgCl$_2$.6H$_2$O. The latex was agitated and coagulated.

Example 2

The polymer sample was prepared and tested as in Example 1 except the monomer ratio of HFP and VDF was 0.42 by weight and the ratio of TFE and VDF was 0.67 by weight.

The resulting fluoropolymer from Examples 1 and 2 and Polymer A were individually tested for Monomer Composition Ratio, Iodine Content, Melting Point and Glass Transition, and Mooney Viscosity using the methods disclosed above. Shown in Table 1 below is a summary of the results.

TABLE 1

| Test | Example 1 | Example 2 | Polymer A |
|---|---|---|---|
| Monomer composition ratio | | | |
| TFE | 41% wt | 32% wt | 42% wt |
| HFP | 22% wt | 25% wt | 20% wt |
| VDF | 37% wt | 43% wt | 38% wt |
| Iodine content | 0.38% | 0.3% | 0.0% |
| Melting Point and Glass Transition | | | |
| $T_g$ | 3° C. | −9° C. | 2° C. |
| $T_m$ | 109° C. | 75° C. | 118° C. |
| Mooney viscosity [ML 1 + 10@121° C.] | 25.7 | 29.7 | 72.7[1] |
| MFI @265° C./5 kg (g/10 min) | 118 | 80 | 18 |

[1]Preheat was 3 minutes.

200 g batches were compounded using 100 parts of the polymer, 30 phr carbon black, 3 phr Co-agent, and 2 phr peroxide on a two-roll mill. The compounded polymer were tested as per "Cure Rheology" and "Molding O-ring and Compression Set" as described above and the results are reported in Table 2. In Comparative A, the resulting compound did not cured well and was unable to be mold into an O-ring for compression test.

TABLE 2

| | Example 3 | Example 4 | Comparative A |
|---|---|---|---|
| Polymer used in compounding | Example 1 | Example 2 | Polymer A |
| Cure rheology 12 min. @ 177° C. | | | |
| ML (dN-m) | 0.3 | 0.5 | 2.1 |
| MH (dN-m) | 33.5 | 30.8 | 4.1 |
| Δ torque (dN-m) | 33.2 | 30.3 | 1.9 |
| ts2 (min) | 0.5 | 0.4 | — |
| t50 (min) | 0.9 | 0.6 | 0.9 |
| t90 (min) | 1.6 | 1.1 | 1.5 |
| tan δ ML | 2.7 | 2.2 | 1.5 |
| tan δ MH | 0.046 | 0.044 | 0.97 |
| Compression set 70 hours @ 200° C. | | | |
| press cure (%) | 29 | 31 | n/a |
| post cure (%) | 26 | 27 | n/a | n/a = not applicable

As shown in the table above, the fluoropolymers comprising the iodine content have an increase in the torque, suggesting that the iodine is contributing to the crosslinking (or curing) of the fluoropolymers.

Foreseeable modifications and alterations of this invention will be apparent to those skilled in the art without departing from the scope and spirit of this invention. This invention should not be restricted to the embodiments that are set forth in this application for illustrative purposes.

What is claimed is:
1. A curable composition comprising:
a fluorinated semi-crystalline polymer comprising repeating divalent monomeric units derived from tetrafluoroethylene (TFE), hexafluoropropylene (HFP) and vinylidene fluoride (VDF) and further comprising at least 0.3 and at most 1% by weight iodine endgroups, wherein the fluorinated semi-crystalline polymer has a storage modulus of at least 0.001 and at most 2.5 MPa at 100° C. as measured at a strain of 1% and a frequency of 1 Hz; and a curing system.

2. The curable composition of claim 1, wherein the composition comprises less than 5% by weight of an amorphous polymer.

3. The curable composition of claim 1, wherein the fluorinated semi-crystalline polymer has a Tm of at least 60° C. and at most 320° C.

4. The curable composition of claim 1, wherein the amount of TFE, HPF and VDF is 20-60 wt % TFE; 10-30 wt % HFP; and 15-60 wt % VDF.

5. The curable composition of claim 1, wherein the fluorinated semi-crystalline polymer comprises repeating divalent monomeric units further derived from at least one of a perfluorovinyl ether monomer, and a perfluoroallyl ether monomer.

6. The curable composition of claim 1, wherein the fluorinated semi-crystalline polymer comprises repeating divalent monomeric units further derived from a cure site monomer.

7. A cured article, wherein the cured article is derived from the curable composition of claim 1.

8. The cured article of claim 7, wherein the cured article is a packer, an o-ring, a seal, a gasket, a hose, or a sheet.

9. The cured article of claim 7, wherein the cured article is a packer, an o-ring, a packer, a seal, or a gasket.

10. The curable composition of claim 1, wherein the fluorinated semi-crystalline polymer has a weight average molecular weight of at least 50,000 daltons and at most 100,000 daltons.

11. The curable composition of claim 1, wherein the fluorinated semi-crystalline polymer has a melting temperature of at least 50° C. and at most 100° C.

12. The curable composition of claim 1, wherein the amount of TFE, HPF and VDF is 25-60 wt % TFE; at least 15-30 wt % HFP; and 15-60 wt % VDF.

13. The curable composition of claim 1, wherein the amount of TFE, HPF and VDF is 25-60 wt % TFE; at least 20-30 wt % HFP; and 15-55 wt % VDF.

14. The curable composition of claim 1, wherein the fluorinated thermosetting plastic comprises at least 0.1 and at most 1 wt % iodine end groups based on the weight of the fluorinated semi-crystalline polymer.

15. The curable composition of claim 1, wherein the curing system comprises a peroxide.

16. The curable composition of claim 1, wherein the curing system comprises an organic peroxide and a cross-linking agent.

17. The curable composition of claim 1, wherein the fluorinated semi-crystalline polymer comprises at least 0.5% and at most 1% by weight iodine endgroups.

18. The curable composition of claim 1, wherein the fluorinated thermosetting plastic has an MFI greater than 7 g/10 min at 265° C. and 5 kg.

19. The curable composition of claim 1, wherein the amount of TFE, HPF and VDF is 30-50 wt % TFE; at least 20-30 wt % HFP; and 30-50 wt % VDF.

20. The curable composition of claim 1, wherein the fluorinated semi-crystalline polymer has a Tm of at least 60° C. and at most 200° C.

* * * * *

UNITED STATES PATENT AND TRADEMARK OFFICE
CERTIFICATE OF CORRECTION

PATENT NO. : 10,927,235 B2  
APPLICATION NO. : 15/741785  
DATED : February 23, 2021  
INVENTOR(S) : Fukushi et al.

Page 1 of 1

It is certified that error appears in the above-identified patent and that said Letters Patent is hereby corrected as shown below:

On the Title Page

<u>Item [57]</u>,
Delete "a" and insert -- at --, therefor.

In the Claims

<u>Column 12</u>,
Lines 5 & 6, Claim 12, delete "at least 15-30" and insert -- 15-30 --, therefor.
Lines 8 & 9, Claim 13, delete "at least 20-30" and insert -- 20-30 --, therefor.

Signed and Sealed this  
Fourth Day of May, 2021

Drew Hirshfeld  
*Performing the Functions and Duties of the*  
*Under Secretary of Commerce for Intellectual Property and*  
*Director of the United States Patent and Trademark Office*